(No Model.)

S. BROWN.
SNAP HOOK.

No. 487,980. Patented Dec. 13, 1892.

WITNESSES:
H. Walker
C. Sedgwick

INVENTOR
S. Brown
BY Munn & Co.
ATTORNEYS.

UNITED STATES PATENT OFFICE.

SAMUEL BROWN, OF QUINCY, OHIO.

SNAP-HOOK.

SPECIFICATION forming part of Letters Patent No. 487,980, dated December 13, 1892.

Application filed September 5, 1892. Serial No. 445,033. (No model.)

*To all whom it may concern:*

Be it known that I, SAMUEL BROWN, of Quincy, in the county of Logan and State of Ohio, have invented a new and useful Improvement in Snap-Hooks, of which the following is a full, clear, and exact description.

This invention relates to snaps or snap-hooks for various purposes or uses, including harness; and it consists in a novel construction of the same, substantially as hereinafter described, and pointed out in the claims, and whereby I am enabled to dispense with a spring for closing the latch of the snap-hook.

Reference is to be had to the accompanying drawings, forming a part of this specification, in which similar letters of reference indicate corresponding parts in all the figures.

Figure 1:
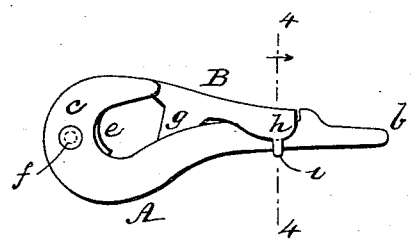
Figure 2:
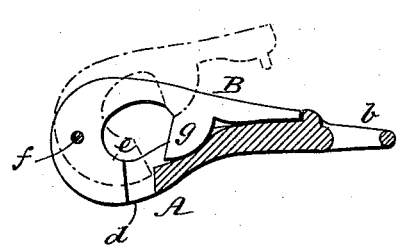
Figure 3:
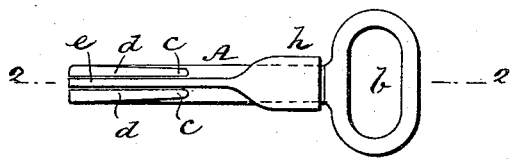
Figure 4:
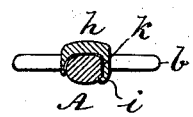

Figure 1 represents a side elevation of my improved snap-hook closed; Fig. 2, a similar view, mainly in section, upon the line 2 2 in Fig. 3, showing by dotted lines the snap-hook open. Fig. 3 is a top view or plan, and Fig. 4 a transverse section upon the line 4 4 in Fig. 1.

A is the hook proper, provided with a loop $b$ at its back end for attachment by strap or otherwise to the article or part it is designed to be applied. The front or nose portion $c$ of the hook is of bifurcated construction, it being grooved, split, or divided in direction of its width, as shown at $d$, for reception within it of the tongue or joint portion $e$ of the opening and closing latch B, which is united with the nose portion $c$ of the hook proper by a pivot $f$. This latch B is also of hook shape and is provided with a nose-piece $g$ intermediately of its length where it crosses the point of the nose of the hook proper A to close the snap-hook when the latch is shut or down. The pivoted or front end portion of said latch then closes within the groove $d$ of the hook A, and its nose-piece $g$ shuts down upon or within a groove in the shank of the hook A to retain the usual ring or other engaging device within the hook. The back portion of the latch is extended and constructed to form a saddle-like projection $h$, which when the latch is closed shuts down over the shank of the hook to steady the latch and relieve it of strain at its joint. Projecting downward from the one side of this saddle-like part $h$ is a lip or pin $i$, having a slight crook inward at its outer end, and the adjacent side of the shank of the hook A is cut away, as at $k$, to admit of said lip passing closely over or down it and engaging as a catch, which it forms, with the shank of the hook A below said cut-away portion $k$ when the latch is closed, and serving as it snaps into engagement to hold the latch closed. The free fit of the parts of the hook A and latch B where they are jointed and pivoted together readily admits of the lip or pin $i$ thus snapping into engagement, and no spring is necessary to hold the latch closed, thus making the snap-hook a springless one. To open the latch, it is simply lifted at its back to disengage the snapping-catch $i$ from the shank of the hook A, as shown in Fig. 2; but at other times—that is, when the latch is closed—there is no liability of the snap-hook being opened, either by its own play or movement or of the usual ring or fastening held within it.

Having thus described my invention, I claim as new and desire to secure by Letters Patent—

1. In a snap-hook, the combination, with the hook proper, of a hook-shaped latch pivoted to the nose end of said hook proper and constructed at its free end with a snap or catch adapted to engage by friction with the shank of the hook proper and to open and close in relation thereto essentially as described, and whereby the snap-hook is held closed without the aid of a spring.

2. In a snap-hook, the combination of the hook proper having a bifurcated nose portion, and the hook-shaped latch pivoted to and working within said nose portion, also provided with a closing nose-piece $g$, and backwardly-extended saddle-like projection $h$, having a snapping or catching lip $i$ for engagement with the shank of the hook proper, substantially as described.

SAMUEL BROWN.

Witnesses:
 JNO. C. SHUERAFT,
 SAM. LEE KING.